US011157170B1

(12) United States Patent
Fox et al.

(10) Patent No.: US 11,157,170 B1
(45) Date of Patent: Oct. 26, 2021

(54) KEYBOARD TREMOR CONTROL

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Jonathan D. Dunne, Dungarvan (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/096,361

(22) Filed: Nov. 12, 2020

(51) Int. Cl.
*G06F 3/048* (2013.01)
*G06F 3/0488* (2013.01)

(52) U.S. Cl.
CPC .............. *G06F 3/04886* (2013.01)

(58) Field of Classification Search
CPC .................................. G06F 3/04886
See application file for complete search history.

(56) References Cited

U.S. PATENT DOCUMENTS

| 4,996,977 | A | * | 3/1991 | Tiedeken | .............. | A61F 5/3761 128/878 |
| 2014/0101595 | A1 | | 4/2014 | Kumara et al. | | |
| 2014/0303605 | A1 | * | 10/2014 | Boyden | ............ | A61B 17/32002 606/1 |
| 2016/0171804 | A1 | | 6/2016 | Chaar | | |
| 2017/0228025 | A1 | | 8/2017 | Hall | | |
| 2018/0039616 | A1 | * | 2/2018 | Shalit | .................. | G06F 3/04883 |
| 2019/0171348 | A1 | | 6/2019 | Vishwakarma | | |
| 2019/0384431 | A1 | | 12/2019 | Berger | | |

OTHER PUBLICATIONS

Anonymous, "User Verification based on Keystroke Dynamics: Python code," Machine Learning in Action, Jul. 26, 2017 [accessed on Jun. 26, 2020]. 13 pages, Retrieved from the Internet: <URL: https://appliedmachinelearning.blog/2017/07/26/user-verification-based-on-keystroke-dynamics-python-code/>.

(Continued)

*Primary Examiner* — Hugo Molina
(74) *Attorney, Agent, or Firm* — Steven M. Bouknight (57) ABSTRACT

A method for adjusting an on-screen virtual keyboard on a computer device is provided. The method may include determining user hand and finger movement in relation to the on-screen virtual keyboard on the computer device. The method may further include determining a user chat discourse based on information associated with a chat interface on the computer device. The method may further include generating a programmatic model that combines and correlates the determined user hand and finger movement on the on-screen virtual keyboard with the determined user chat discourse. The method may further include dynamically adjusting an on-screen virtual keyboard layout associated with the on-screen virtual keyboard using the programmatic model, wherein dynamically adjusting the on-screen virtual keyboard layout comprises adjusting one or more keys on the on-screen virtual keyboard in response to information associated with a user and the chat interface.

20 Claims, 8 Drawing Sheets

(56) References Cited

OTHER PUBLICATIONS

Iakovakis, et al., "Touchscreen typing-pattern analysis for detecting fine motor skills decline in early-stage Parkinson's disease," Scientific Reports, Published May 16, 2018, 13 pages, [accessed on Jun. 26, 2020]. Retrieved rom the Internet: <URL: https://www.researchgate.net/publication/325179156_Touchscreen_typing-pattern_analysis_for_detecting_fine_motor_skills_decline_in_early-stage_Parkinson's_disease> < DOI:10.1038/s41598-018-25999-0>.

Roy, et al., "Distance Based Models of Keystroke Dynamics User Authentication," International Journal of Advanced Engineering Research and Science (IJAERS), [vol. 2, Issue-9, Sep. 2015], ISSN:2349-6495, pp. 89-94, [accessed on Oct. 20, 2020]. Retrieved from Internet <https://www.academia.edu/16394431/Distance_Based_Models_of_Keystroke_Dynamics_User_Authentication>.

Wikipedia, "Keystroke dynamics," Wikipedia, the free encyclopedia, [accessed on Jun. 26, 2020]. 6 pages, Retrieved from the Internet: <URL: https://en.wikipedia.org/wiki/Keystroke_dynamics>.

Zolfagharufard, "Could your keyboard reveal if you have Parkinson's? Typing patterns may highlight brain disorders, claim scientists," Daily Mail.com, Published: Apr. 2, 2015 [accessed on Jun. 26, 2020]. 37 pages, Retrieved from the Internet: <URL: https://www.dailymail.co.uk/sciencetech/article-3023888/Could-keyboard-reveal-Parkinson-s-Typing-patterns-highlight-brain-disorders-claim-scientists.html>.

* cited by examiner

FIG. 8 ary model, wherein dynamically adjusting the on-screen virtual keyboard layout comprises adjusting one or more keys on the on-screen virtual keyboard in response to information associated with a user and the chat interface.

A computer program product for adjusting an on-screen virtual keyboard on a computer device is provided. The computer program product may include one or more computer-readable storage devices and program instructions stored on at least one of the one or more tangible storage devices, the program instructions executable by a processor. The computer program product may include program instructions to determine user hand and finger movement in relation to the on-screen virtual keyboard on the computer device. The computer program product may include program instructions to determine a user chat discourse based on information associated with a chat interface on the computer device. The computer program product may include program instructions to generate a programmatic model that combines and correlates the determined user hand and finger movement on the on-screen virtual keyboard with the determined user chat discourse. The computer program product may include program instructions to dynamically adjust an on-screen virtual keyboard layout associated with the on-screen virtual keyboard using the programmatic model, wherein dynamically adjusting the on-screen virtual keyboard layout comprises adjusting one or more keys on the on-screen virtual keyboard in response to information associated with a user and the chat interface.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As previously described, embodiments of the present invention relate generally to the field of computing, and more particularly, to adjusting an on-screen keyboard layout. Specifically, the following described exemplary embodiments provide a system, method and program product for adjusting and calibrating an on-screen keyboard layout to compensate for user hand tremors. More specifically, the present invention has the capacity to improve the technical field associated with on-screen keyboards by first identifying and modeling a user's hand and finger movement relative to an on-screen virtual keyboard as well as modeling a user's chat discourse to generate a keyboard tremor control (KTC) programmatic model. Then, in turn, the KTC programmatic model may be applied to the on-screen virtual keyboard layout during a user's interaction on a chat interface to adjust the on-screen virtual keyboard layout and compensate for the user's hand tremors. Specifically, the system, method and program product may adjust the on-screen virtual keyboard layout by displacing the keys on the on-screen virtual keyboard and/or adjusting a touch sensitivity of certain keys on the on-screen virtual keyboard as appropriate.

As previously described with respect to tremors, while tremors may occur in body parts such as arms, head, vocal cords, torso, and legs, tremors more commonly occur in hands. Likewise, and as previously described, one effect that tremors may cause is shaky hands. Specifically, hand tremors can cause shaky hands that can lead to difficulties in writing, drawing, and typing on a touch screen keyboard. Unfortunately, with respect to touch screen keyboards on devices such as mobile phones, tablets, and other computer devices, existing technology and methods fall short in providing solutions for users to type with precision when exhibiting hand tremors. As such, it may be advantageous, among other things, to provide a method, computer system, and computer program product for adjusting and calibrating an on-screen keyboard layout on a computing device to compensate for a user's hand tremors.

Specifically, the method, computer system, and computer program product may identify and model a user's hand and finger movement relative to an on-screen virtual keyboard. Additionally, the method, computer system, and computer program product may determine and model a user's chat discourse. Thereafter, the method, computer system, and computer program product may combine the modeled user's hand and finger movement with the modeled user's chat discourse to generate a keyboard tremor control (KTC) programmatic model whereby the KTC programmatic model may be used to correlate a user's keyboard pattern with the concepts and topics identified from the user's discourse. More specifically, the KTC programmatic model may adjust/calibrate an on-screen virtual keyboard layout based on a history of the user's level of hand and finger movement dispersion on an on-screen virtual keyboard and in response to identifying information on the chat interface, such as identifying certain topics, certain person or groups of people in the chat, and/or other information that may potentially trigger the user's hand tremors. As such, the KTC programmatic model may be applied to the on-screen virtual keyboard layout during a user's interaction on a chat interface to adjust the on-screen virtual keyboard layout and compensate for the user's hand tremors.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
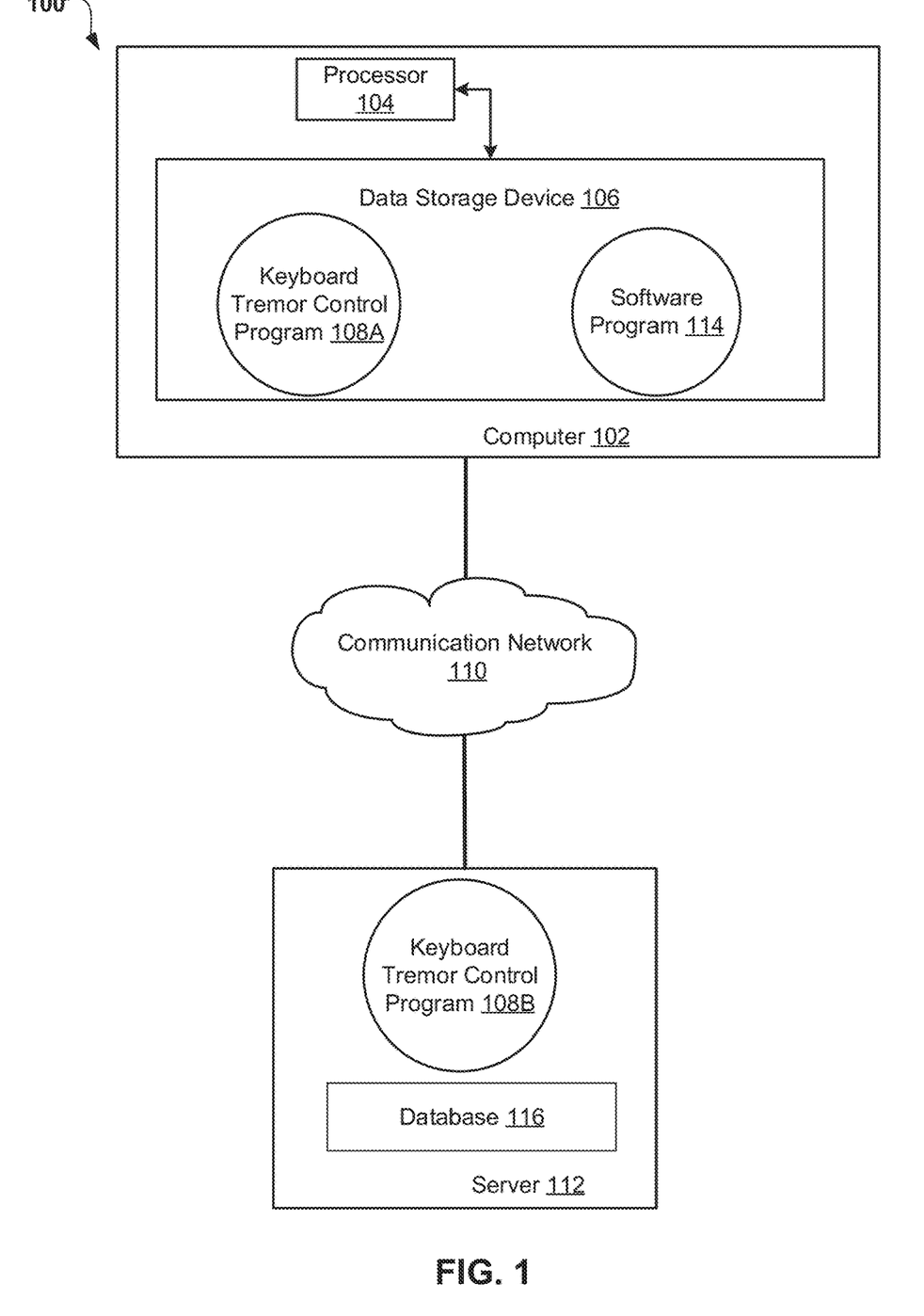
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a keyboard tremor control program 108A and a software program 114, and may also include a microphone (not shown). The software program 114 may be an application program such as a virtual keyboard application and/or one or more mobile apps running on a client computer 102, such as a desktop, laptop, tablet, and mobile phone device. The keyboard tremor control program 108A may communicate with the software program 114. The networked computer environment 100 may also include a server 112 that is enabled to run a keyboard tremor control program 108B and the communication network 110. The networked computer environment 100 may include a plurality of computers 102 and servers 112, only one of which is shown for illustrative brevity. For example, the plurality of computers 102 may include a plurality of interconnected devices, such as the mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the keyboard tremor control program 108A, 108B may interact with a database 116 that may be embedded in various storage devices, such as, but not limited to, a mobile device 102, a networked server 112, or a cloud storage service.

According to the present embodiment, a program, such as a keyboard tremor control program 108A and 108B may run on the client computer 102 and/or on the server computer 112 via a communications network 110. The keyboard tremor control program 108A, 108B may adjust and calibrate an on-screen keyboard layout that is presented on client computer 102 to compensate for user hand tremors. Specifically, a user using a client computer 102, such as a laptop device, may run a keyboard tremor control program 108A, 108B that may interact with a software program 114, such as a virtual keyboard application, to identify and extract relevant sentence from a comment in a comments section associated with an online publication, determine the context surrounding the relevant sentence (i.e. the scope of the comment), and generate in the text associated with the online publication a comment excerpt including the relevant sentence and the surrounding context (i.e. scope) associated with the relevant sentence.

Figure 2:
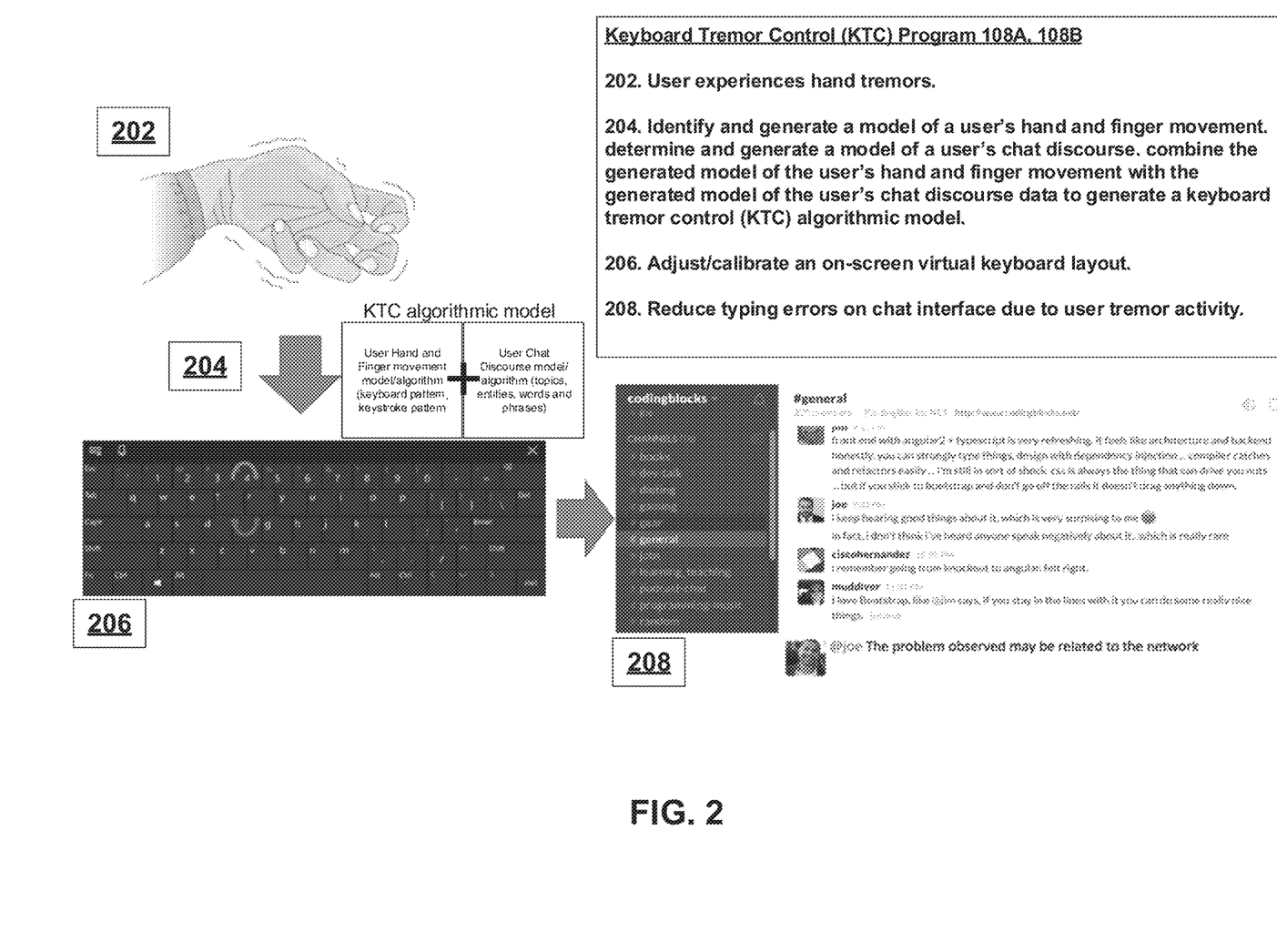
FIG. 2 is a visual representation of an embodiment of a keyboard tremor control program according to one embodiment.

Referring now to FIG. 2, a visual representation of an embodiment 200 of the present invention is depicted. Specifically, according to one embodiment, the keyboard tremor control program 108A, 108B may adjust/calibrate an on-screen virtual keyboard layout to compensate for a user's hand tremors. For example, the keyboard tremor control program 108A, 108B may rearrange the on-screen virtual keyboard layout by displacing keys on the on-screen virtual keyboard and/or adjusting a touch sensitivity of certain keys on the on-screen virtual keyboard as appropriate based on a user's keyboard/keystroke pattern. As illustrated in FIG. 2, at 202, a user may experience hand tremors. As such, the keyboard tremor control program 108A, 108B may first identify and generate a model of a user's hand and finger movement. Specifically, and according to one embodiment, the keyboard tremor control program 108A, 108B may identify and generate a model of a user's hand and finger movement in relation to the user's hand tremors. More specifically, and as will be further described with respect to FIG. 3, the keyboard tremor control program 108A, 108B may use existing hand and finger tracking technology to track a user's hand and finger movement during a hand tremor relative to an on-screen virtual keyboard to establish a user's keyboard/keystroke pattern. Furthermore, the keyboard tremor control program 108A, 108B may determine and generate a model of a user's chat discourse, which may include performing topic analysis and corpus linguistic analysis of the user's conversation on a chat interface/platform to identify topics, entities, words and phrases associated with user chat conversations.

Thereafter, at 204, the keyboard tremor control program 108A, 108B may combine the generated model of the user's hand and finger movement with the generated model of the user's chat discourse data to generate a keyboard tremor control (KTC) programmatic model. As will be described with respect to FIG. 5, the keyboard tremor control program 108A, 108B may use the KTC programmatic model to dynamically identify and correlate a user's keyboard and keystroke pattern with the user's chat discourse. For example, the keyboard tremor control program 108A, 108B may use the KTC programmatic model to adjust/calibrate an on-screen virtual keyboard layout 206 based on the history of the user's level of hand and finger movement dispersion on an on-screen virtual keyboard and in response to identifying information on the chat interface, such as identifying certain topics, certain person or groups of people in the chat, and/or other information that may trigger the user's hand tremors. As such, the KTC programmatic model may be applied to the on-screen virtual keyboard layout 206 during a user's interaction on a chat interface 208 to adjust the on-screen virtual keyboard layout 206 and compensate for the user's hand tremors. For example, and as previously described, the keyboard tremor control program 108A, 108B may displace the keys on the on-screen virtual keyboard and/or adjust the touch sensitivity of certain keys on the on-screen virtual keyboard as appropriate.

Figure 3:
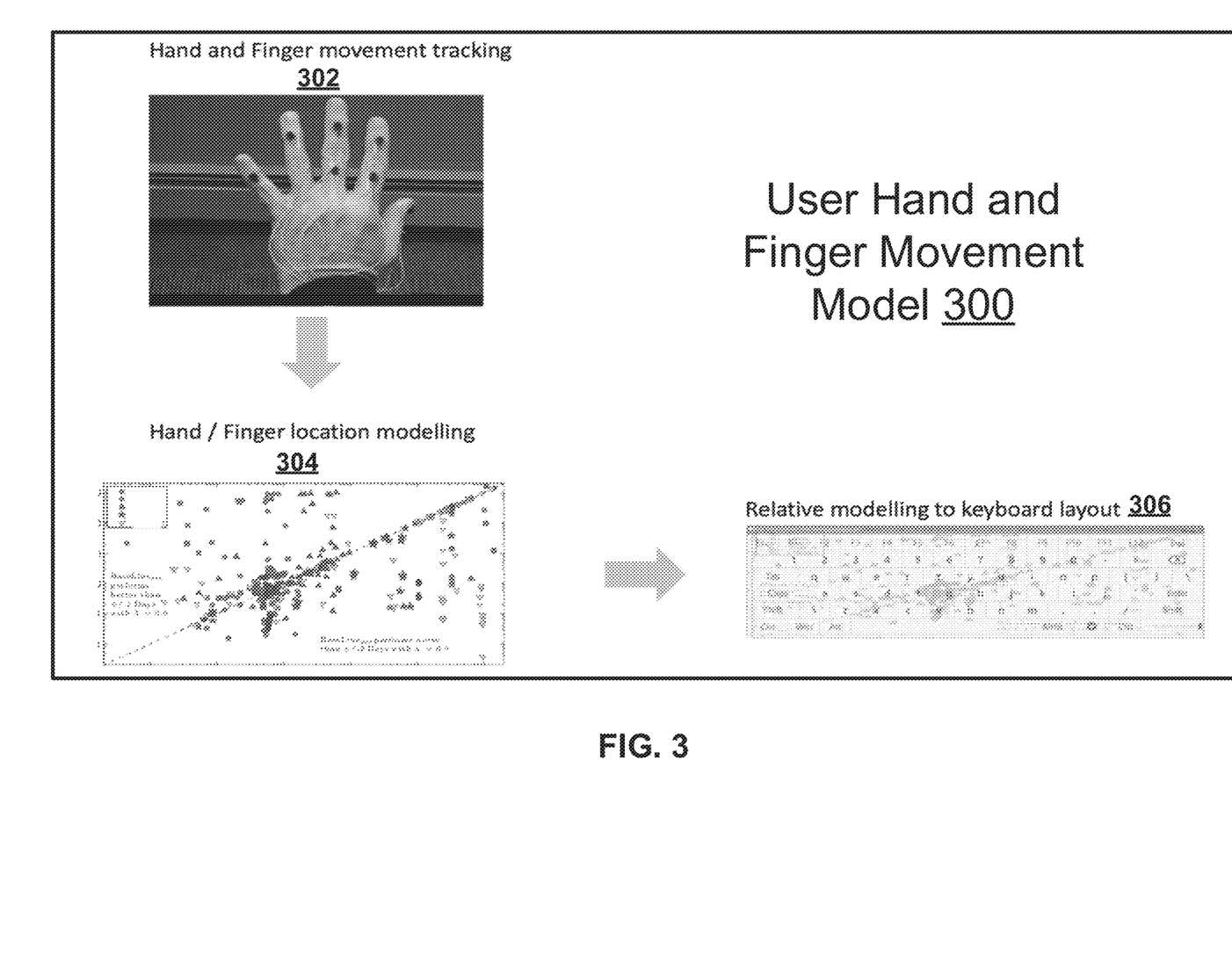
FIG. 3 is an exemplary diagram illustrating a step for identifying and generating a model of a user's hand and finger movement associated with an aspect of the present invention according to one embodiment.

The steps carried out by the keyboard tremor control program 108A, 108B for adjusting/calibrating an on-screen virtual keyboard layout to compensate for a user's hand tremors will be described in greater detail with reference to FIGS. 3-5. Specifically, with respect to FIG. 3, and as previously described, the keyboard tremor control program 108A, 108B may first identify and generate a model of a user's hand and finger movement 300. More specifically, the keyboard tremor control program 108A, 108B may use existing hand and finger tracking technology 302 to track a user's hand and finger movement relative to an on-screen virtual keyboard 306. For example, and as illustrated in FIG. 3 at 302, the keyboard tremor control program 108A, 108B may use hand and finger tracking technology 302, such as computer-generated imagery (CGI), to digitize and locate elements of the hand (for example, using IoT devices, wires and sensors), and then use the digitized elements to generate a model of a user's hand and the user's hand tremors at 304. Furthermore, the keyboard tremor control program 108A, 108B may track hand and finger movement relative to an on-screen virtual keyboard 306. Specifically, the keyboard tremor control program 108A, 108B may detect where the hand and fingers move with respect to the on-screen virtual keyboard 306 to determine a user's keyboard pattern and/or keystroke pattern, for example, by determining where a user's finger moves when trying to type a key such as an "F" key or an "E" key on the on-screen virtual keyboard. In turn, the keyboard tremor control program 108A, 108B may use such data to generate a model of the user's hand, and more specifically, generate a model of the user's hand and finger movement with respect to an on-screen virtual keyboard in case of the user experiencing hand tremors. As such, the generated algorithm/model of the user's hand and finger movement may serve as baseline or benchmark of how the hand and fingers react/move during hand tremors, and more specifically, how the hand and fingers react/move with respect to an on-screen virtual keyboard 306.

According to one embodiment, the keyboard tremor control program 108A, 108B may also include one or more machine learning algorithms that dynamically updates the generated model of the user's hand and finger movement 300. Specifically, based on a user's recurring real-time interaction with the on-screen virtual keyboard, and more specifically, based on continuous detection of the user's keystrokes on the on-screen virtual keyboard, the keyboard tremor control program 108A, 108B may dynamically update, i.e. in real-time, the model of the user's hand and finger movement 300 with the most recent detections of the user's keyboard pattern and/or keystroke pattern. For example, using known machine learning algorithms, as well as the topic analysis and corpus linguistic analysis described in greater detail with respect to FIG. 4, the keyboard tremor control program 108A, 108B may detect that when the user is trying to type an "W" key on the on-screen virtual keyboard, the user mistakenly types an "S." Specifically, the keyboard tremor control program 108A, 108B may detect that, on a threshold number of occasions (i.e. greater than 50%), the user types, then deletes, the letter "S" on the on-screen virtual keyboard and replaces the letter "S" with the letter "W." As such, the keyboard tremor control program 108A, 108B may determine that the user is mistakenly typing the letter "S" when trying to type the letter "W", and in turn, may dynamically update the generated model of the user's hand and finger movement with this information regarding the detection of the user's interaction with the letters "S" and "W" on the on-screen virtual keyboard.

Furthermore, according to one embodiment, the keyboard tremor control program 108A, 108B may use the model of the user's hand and finger movement to distinguish the user's hand and finger movement between different types of on-screen virtual keyboards and/or different types of devices. Specifically, given that all on-screen virtual keyboards may not be designed the same and/or that different computer devices may be arranged in the user's hand in different ways, the keyboard tremor control program 108A, 108B may use the model of the user's hand and finger movement to distinguish the user's interaction with one type of on-screen virtual keyboard and/or computer device over a different type of on-screen virtual keyboard and/or different type of computer device. For example, the user's interaction with an on-screen virtual keyboard on a tablet may be different from the user's interaction with an on-screen virtual keyboard on a mobile phone, and/or the user's interaction with one brand of an on-screen virtual keyboard application may be different from the user's interaction with a different on-screen virtual keyboard application. As such, according to one embodiment, the keyboard tremor control program 108A, 108B may, for example, and with permissions, identify and register a user's device and/or type of on-screen virtual keyboard application that the user is using. Therefore, according to one embodiment, the keyboard tremor control program 108A, 108B may specifically correlate and/or separate the user's hand and finger movement data between specific types of computer devices that the user is using and or with the specific type of on-screen virtual keyboard that the user is using. In turn, the keyboard tremor control program 108A, 108B may adjust an on-screen virtual keyboard layout based specifically on the type of computer device and/or type of on-screen virtual keyboard that the user is using.

Figure 4:
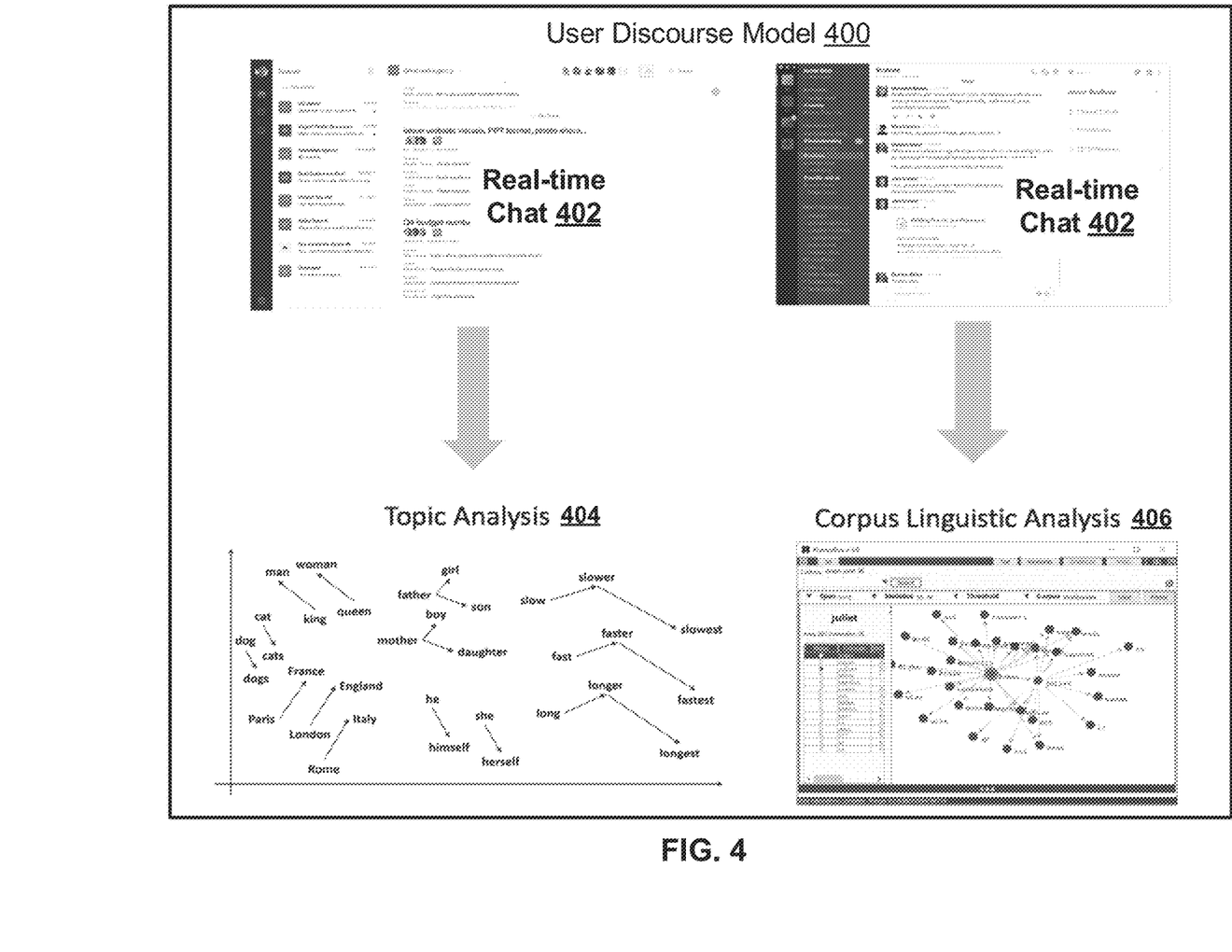
FIG. 4 is an exemplary diagram illustrating a step for determining and generating a model of a user's chat discourse associated with an aspect of the present invention according to one embodiment.

Furthermore, and as depicted in FIG. 4, the keyboard tremor control program 108A, 108B may determine and generate a model of a user's chat discourse 400, which may include performing topic analysis 404 and corpus linguistic analysis 406 on the user's conversations associated with a chat interface/platform 402. More specifically, the keyboard tremor control program 108A, 108B may apply existing topic analysis methods such as natural language processing (NLP), Latent Dirichlet allocation (LDA), and/or Biterm topic modeling to a user's chat 402 (including words and phrases used by the user as well as by other users). For example, as illustrated in FIG. 4, the keyboard tremor control program 108A, 108B may these topic analysis techniques to analyze a user's conversation on a chat interface/platform such as Slack® (Slack and all Slack-based trademarks and logos are trademarks or registered trademarks of Slack Technologies, Inc. and/or its affiliates). In turn, the keyboard tremor control program 108A, 108B may identify which types of topics and entities the user may be discussing or typing about on the chat interface/platform, Slack® 402. Likewise, the keyboard tremor control program 108A, 108B may also use corpus linguistic analysis 406 to identify collocations and colligations of user conversations. Specifically, using corpus linguistic analysis, the keyboard tremor control program 108A, 108B may identify collocations by detecting the habitual juxtaposition of a particular word with another word, or words, which may occur at a certain threshold frequency (such as greater than 50%). Furthermore, the keyboard tremor control program 108A, 108B may use corpus linguistic analysis to identify colligations by identifying a syntactic pattern associated with a user's conversation, or more specifically, by identifying a grouping of words associated with a user conversation based on the way the words function in a syntactic structure. In turn, the keyboard tremor control program 108A, 108B may generate a model of a user's chat discourse 400 by combining the data based on the topic analysis 404 and the data based on the corpus linguistic analysis 406 to establish a benchmark, or baseline, of the types of topics, entities, and words/phrases that are typically/historically associated with a user and the user's conversations.

According to one embodiment, the generated model of the user's chat discourse 400 may also include timestamped data that chronicles when the user types about certain topics and entities, when the user is involved in certain discussions about certain topics and entities, and/or when the user uses certain words/phrases when using an on-screen virtual keyboard as well as on which particular chat interface/platform the user performs such actions. For example, using topic analysis 404 and corpus linguistic analysis 406, as well as one or more machine learning algorithms, the keyboard tremor control program 108A, 108B may record and determine when (i.e. time, day, location) a user discusses politics or when a user types about work, and/or on which chat interface/platform the user discusses a certain topic such as work—for example, determining that the user only discusses work on Slack®. In turn, the keyboard tremor control program 108A, 108B may use the timestamped data as another source of information to be included in the model of the user's chat discourse 400.

Figure 5:
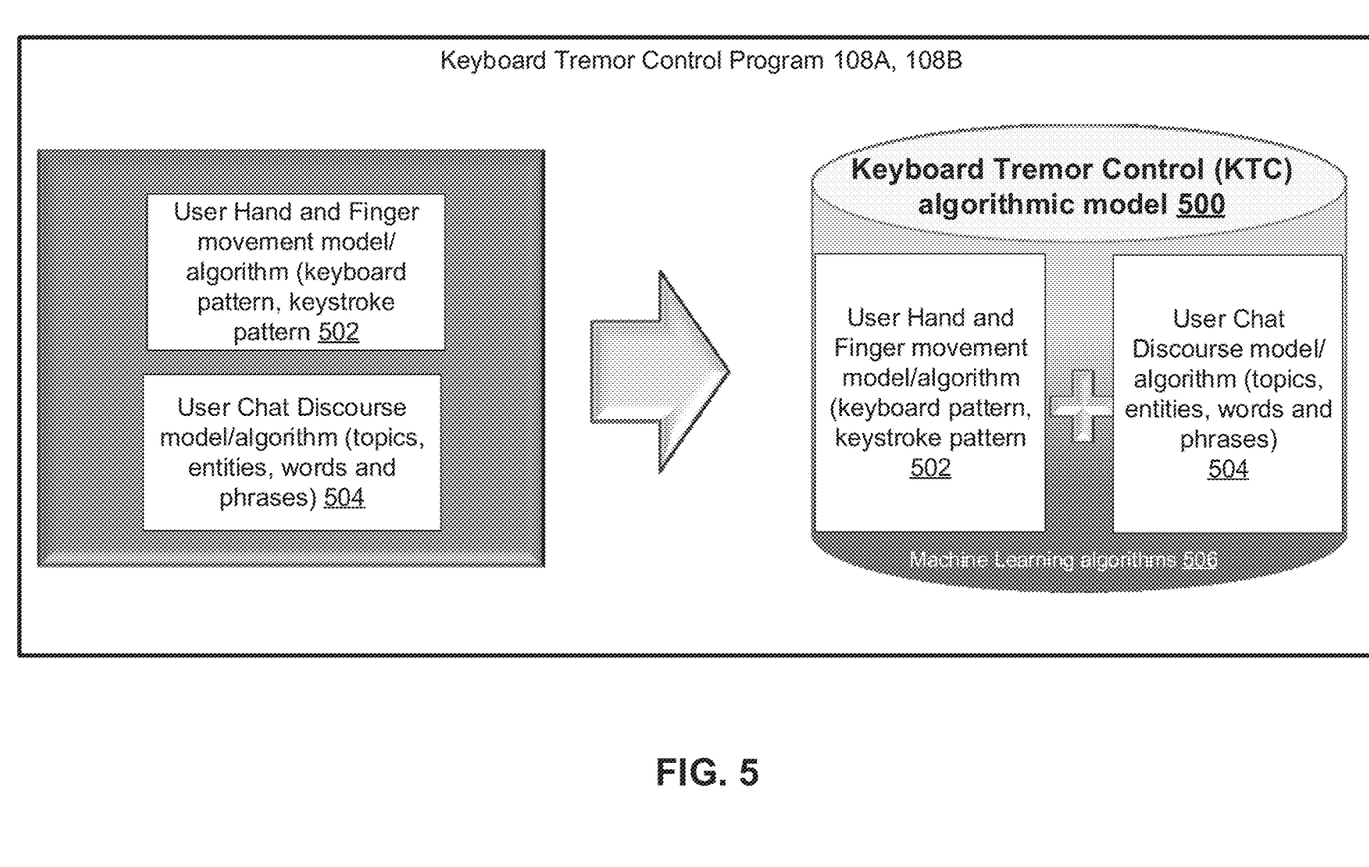
FIG. 5 is an exemplary diagram illustrating a keyboard tremor control (KTC) programmatic model based on a combination of the generated model of the user's hand and finger movement with the generated model of the user's chat discourse according to one embodiment.

Thereafter, and as depicted in FIG. 5, the keyboard tremor control program 108A, 108B may combine the generated algorithm/model of the user's hand and finger movement 502 with the generated algorithm/model of the user's chat discourse 504 to generate a keyboard tremor control (KTC) programmatic model 500. Specifically, based on the combination of the generated algorithm/model of the user's hand and finger movement data with the generated algorithm/model of the user's chat discourse data, the keyboard tremor control program 108A, 108B may use the keyboard tremor control (KTC) programmatic model to correlate or cross-reference the user's hand and finger movement data relative to the on-screen virtual keyboard with the topic, entities, words/phrases that are historically and/or dynamically typed by the user on a chat interface/platform. In turn, and as previously described with respect to FIG. 2, the keyboard tremor control program 108A, 108B may use the KTC programmatic model to dynamically and temporally adjust an on-screen virtual keyboard layout to compensate for a user's hand tremors by, for example, rearranging one or more keys on the on-screen virtual keyboard. Specifically, for example, based on the model of the user's chat discourse that is integrated in the generated keyboard tremor control (KTC) programmatic model, the keyboard tremor control program 108A, 108B may determine that a user is discussing a certain topic on a chat interface/platform, such as discussing a work topic called "Watson." Furthermore, based on the model of the user's hand and finger movement that is also integrated in the KTC programmatic model, the keyboard tremor control program 108A, 108B may determine that when the user has typically/historically typed the letter "S", more often than not (i.e. greater than 50%), the user actually intends to type the letter "W". Therefore, based on this information and the detection that the user is discussing the topic "Watson," the keyboard tremor control program 108A, 108B may use the KTC programmatic model to temporally adjust the on-screen virtual keyboard that is being used by the user by, for example, displacing or interchanging the location of the "S" and "W" keys whereby the "W" key may now be located in the position where the "S" is typically located. According to one embodiment, the keyboard tremor control program 108A, 108B may adjust the on-screen virtual keyboard layout by displacing one or more keys (as described above) and/or reducing the touch sensitivity of one or more keys. For example, reducing the touch sensitivity of one or more keys may include requiring a user to long-press a key in order to register that the key is being touched. In this case, because the user typically/historically has typed the letter "S" when actually intending to type the letter "W", the keyboard tremor control program 108A, 108B may adjust the on-screen virtual keyboard by reducing the touch sensitivity of the letter "S" such that typing the letter "S" may require a long-press of the "S" key. In turn, the keyboard tremor control program 108A, 108B may reduce the user's mistake of typing the letter "S" when intending to type the letter "W".

Furthermore, according to one embodiment, the keyboard tremor control program 108A, 108B may dynamically, i.e. in real-time, adjust an on-screen virtual keyboard based on one or more other factors. Specifically, for example, one factor may include a time factor whereby the keyboard tremor control program 108A, 108B may detect that the user is typing on an on-screen virtual keyboard during a specific time of day. For example, a user's hand tremors may be worse during the morning, such as between 9 am and 10 am, or the user may generally type different in the mornings (such as due to typing in bed as opposed to typing while sitting/standing up). As such, based on the KTC programmatic model (that may include machine learning algorithms 506), the keyboard tremor control program 108A, 108B may determine to temporally adjust a user's on-screen virtual keyboard between the hours of 9 am and 10 am. Another factor may include a location factor detecting the user's location. For example, a user may experience hand tremors at a certain location, such as at work. Therefore, the keyboard tremor control program 108A, 108B may use global positioning satellite (GPS) data to detect the user's computer device location, and in response to detecting that the user is at work, the keyboard tremor control program 108A, 108B may dynamically adjust the on-screen virtual keyboard as appropriate based on the user hand and finger movement. Furthermore, another factor may include detecting specific information in the user's chat conversation, such as by detecting other users in a chat and, in response to identifying that the user experiences hand tremors when chatting with certain people, the keyboard tremor control program 108A, 108B may dynamically adjust the on-screen virtual keyboard accordingly based on the user hand and finger movement. Furthermore, in response to identifying certain topics and entities in a chat (as described above), where the user may experience hand tremors with those certain topics and entities, the keyboard tremor control program 108A, 108B may dynamically adjust the on-screen virtual keyboard as appropriate based on the user hand and finger movement. Additionally, in response to identifying a type of chat interface/platform that the user is using, such identifying that the user is on Slack®, and that the user typically experiences hand tremors when using Slack®, the keyboard tremor control program 108A, 108B may dynamically adjust the on-screen virtual keyboard accordingly based on the user hand and finger movement. In turn, the keyboard tremor control program 108A, 108B may use one factor or a combination of the different factors described above and correlate the factor(s) with the user's keyboard/keystroke pattern to dynamically adjust an on-screen virtual keyboard layout.

It may be appreciated that FIGS. 2-5 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
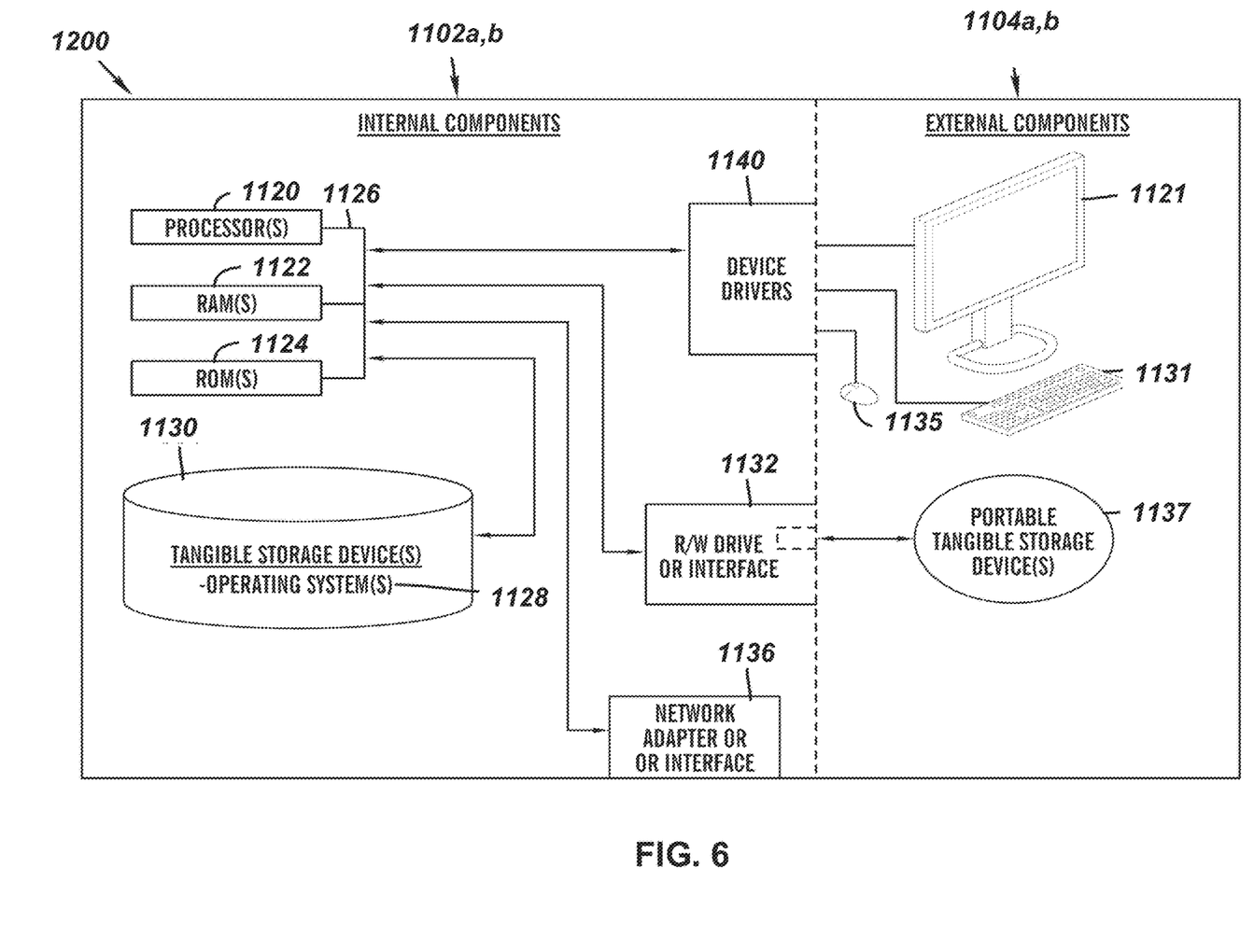
FIG. 6 is a block diagram of the system architecture of the program for adjusting an on-screen virtual keyboard according to one embodiment.

FIG. 6 is a block diagram 1100 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 110, 1104 is representative of any electronic device capable of executing machine-readable program instructions. Data processing system 1102, 1104 may be representative of a smart phone, a computer system, PDA, or other electronic devices. Examples of computing systems, environments, and/or configurations that may be represented by data processing system 1102, 1104 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 1102 *a, b* and external components 1104 *a, b* illustrated in FIG. 6. Each of the sets of internal components 1102 *a, b* includes one or more processors 1120, one or more computer-readable RAMs 1122, and one or more computer-readable ROMs 1124 on one or more buses 1126, and one or more operating systems 1128 and one or more computer-readable tangible storage devices 1130. The one or more operating systems 1128, the software program 114 (FIG. 1) and the keyboard tremor control program 108A (FIG. 1) in client computer 102 (FIG. 1), and the keyboard tremor control program 108B (FIG. 1) in network server computer 112 (FIG. 1) are stored on one or more of the respective computer-readable tangible storage devices 1130 for execution by one or more of the respective processors 1120 via one or more of the respective RAMs 1122 (which typically include cache memory). In the embodiment illustrated in FIG. 6, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

Each set of internal components 1102 *a, b*, also includes a R/W drive or interface 1132 to read from and write to one or more portable computer-readable tangible storage devices 1137 such as a CD-ROM, DVD, memory stick, magnetic tape, magnetic disk, optical disk or semiconductor storage device. A software program, such as a keyboard tremor control program 108A and 108B (FIG. 1), can be stored on one or more of the respective portable computer-readable tangible storage devices 1137, read via the respective R/W drive or interface 1132, and loaded into the respective hard drive 1130.

Each set of internal components 1102 *a, b* also includes network adapters or interfaces 1136 such as a TCP/IP adapter cards, wireless Wi-Fi interface cards, or 3G or 4G wireless interface cards or other wired or wireless communication links. The keyboard tremor control program 108A

(FIG. 1) and software program 114 (FIG. 1) in client computer 102 (FIG. 1), and the keyboard tremor control program 108B (FIG. 1) in network server 112 (FIG. 1) can be downloaded to client computer 102 (FIG. 1) from an external computer via a network (for example, the Internet, a local area network or other, wide area network) and respective network adapters or interfaces 1136. From the network adapters or interfaces 1136, the keyboard tremor control program 108A (FIG. 1) and software program 114 (FIG. 1) in client computer 102 (FIG. 1) and the keyboard tremor control program 108B (FIG. 1) in network server computer 112 (FIG. 1) are loaded into the respective hard drive 1130. The network may comprise copper wires, optical fibers, wireless transmission, routers, firewalls, switches, gateway computers, and/or edge servers.

Each of the sets of external components 1104 a, b can include a computer display monitor 1121, a keyboard 1131, and a computer mouse 1135. External components 1104 a, b can also include touch screens, virtual keyboards, touch pads, pointing devices, and other human interface devices. Each of the sets of internal components 1102 a, b also includes device drivers 1140 to interface to computer display monitor 1121, keyboard 1131, and computer mouse 1135. The device drivers 1140, R/W drive or interface 1132, and network adapter or interface 1136 comprise hardware and software (stored in storage device 1130 and/or ROM 1124).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
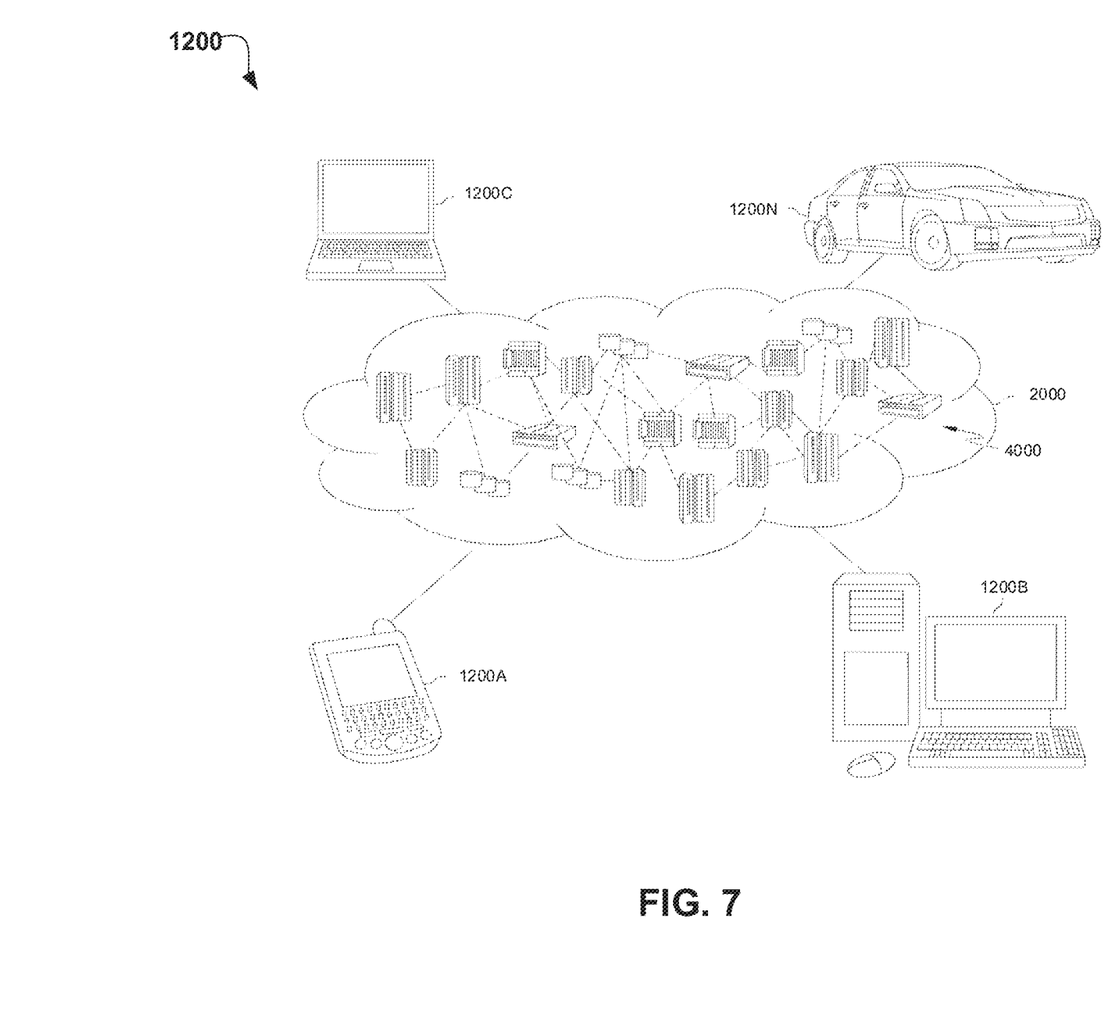
FIG. 7 is a block diagram of an illustrative cloud computing environment including the computer system depicted in FIG. 1, in accordance with an embodiment of the present disclosure.

Referring now to FIG. 7, illustrative cloud computing environment 1200 is depicted. As shown, cloud computing environment 1200 comprises one or more cloud computing nodes 4000 with which local computing devices used by cloud consumers, such as, for example, personal digital assistant (PDA) or cellular telephone 1200A, desktop computer 1200B, laptop computer 1200C, and/or automobile computer system 1200N may communicate. Nodes 4000 may communicate with one another. They may be grouped (not shown) physically or virtually, in one or more networks, such as Private, Community, Public, or Hybrid clouds as described hereinabove, or a combination thereof. This allows cloud computing environment 2000 to offer infrastructure, platforms and/or software as services for which a cloud consumer does not need to maintain resources on a local computing device. It is understood that the types of computing devices 1200A-N shown in FIG. 8 are intended to be illustrative only and that computing nodes 4000 and cloud computing environment 2000 can communicate with any type of computerized device over any type of network and/or network addressable connection (e.g., using a web browser).

Figure 8:
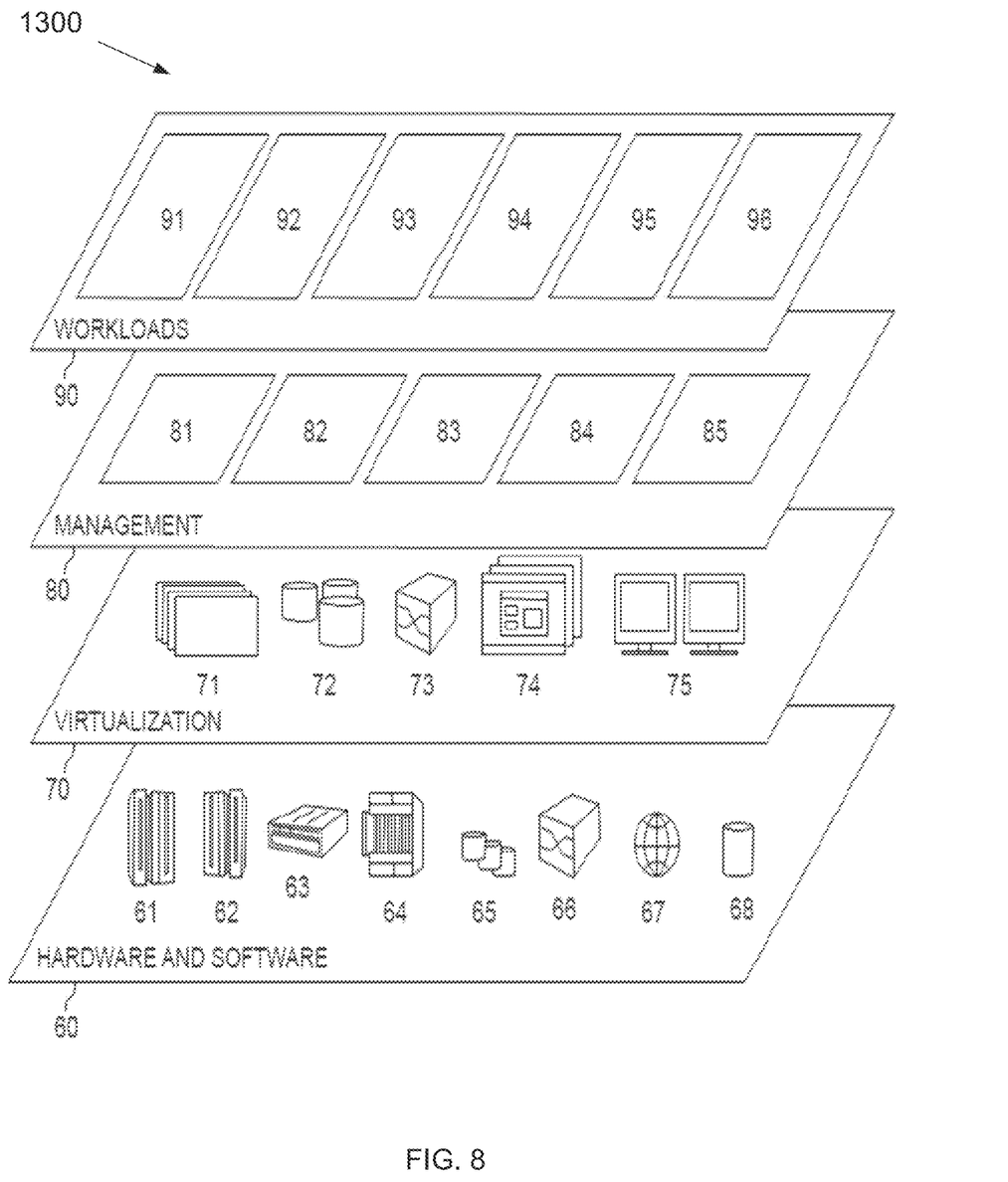
FIG. 8 is a block diagram of functional layers of the illustrative cloud computing environment of FIG. 7, in accordance with an embodiment of the present disclosure.

Referring now to FIG. 8, a set of functional abstraction layers 1300 provided by cloud computing environment 1200 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and keyboard tremor control 96. A keyboard tremor control program 108A, 108B (FIG. 1) may be offered "as a service in the cloud" (i.e., Software as a Service (SaaS)) for applications running on computing devices 102 (FIG. 1) and may, on a computing device, adjust an on-screen virtual keyboard layout to compensate for a user's hand tremors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adjusting an on-screen virtual keyboard on a computer device, the method comprising:
    determining user hand and finger movement in relation to the on-screen virtual keyboard on the computer device;
    determining a user chat discourse based on information associated with a chat interface on the computer device;
    generating a programmatic model that combines and correlates the determined user hand and finger movement on the on-screen virtual keyboard with the determined user chat discourse; and
    dynamically adjusting an on-screen virtual keyboard layout associated with the on-screen virtual keyboard using the programmatic model, wherein dynamically adjusting the on-screen virtual keyboard layout comprises adjusting one or more keys on the on-screen virtual keyboard in response to information associated with a user and the chat interface.

2. The method of claim 1, wherein determining user hand and finger movement in relation to the on-screen virtual keyboard on the computer device further comprises:
    digitally recording a user keystroke pattern on the on-screen virtual keyboard.

3. The method of claim 2, wherein determining the user chat discourse based on information associated with the chat interface further comprises:
    performing topic analysis and corpus linguistic on the chat interface to identify the information associated with the chat interface including identifying one or more topics, one or more entities, and one or more words and phrases associated with user conversations on the chat interface.

4. The method of claim 3, wherein the generated programmatic model correlates the user keystroke pattern with the identified information associated with the user chat discourse and adjust the on-screen virtual keyboard layout based on the user keystroke pattern.

5. The method of claim 1, wherein adjusting the one or more keys on the on-screen virtual keyboard further comprises:
    displacing one or more keys on the on-screen virtual keyboard, wherein the displaced one or more keys is moved from a first position to a second position.

6. The method of claim 1, wherein adjusting the one or more keys on the on-screen virtual keyboard further comprises:
    reducing a touch sensitivity of one or more keys on the on-screen virtual keyboard.

7. The method of claim 6, wherein dynamically adjusting the on-screen virtual keyboard layout further comprises:
    dynamically adjusting the on-screen virtual keyboard layout in response to one or more factors, wherein the one or more factors include a time factor and a location factor.

8. A computer system for adjusting an on-screen virtual keyboard on a computer device, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

determining user hand and finger movement in relation to the on-screen virtual keyboard on the computer device;

determining a user chat discourse based on information associated with a chat interface on the computer device;

generating a programmatic model that combines and correlates the determined user hand and finger movement on the on-screen virtual keyboard with the determined user chat discourse; and dynamically adjusting an on-screen virtual keyboard layout associated with the on-screen virtual keyboard using the programmatic model, wherein dynamically adjusting the on-screen virtual keyboard layout comprises adjusting one or more keys on the on-screen virtual keyboard in response to information associated with a user and the chat interface.

9. The computer system of claim 8, wherein determining user hand and finger movement in relation to the on-screen virtual keyboard on the computer device further comprises:

digitally recording a user keystroke pattern on the on-screen virtual keyboard.

10. The computer system of claim 9, wherein determining a user chat discourse based on information associated with the chat interface further comprises:

performing topic analysis and corpus linguistic on the chat interface to identify the information associated with the chat interface including identifying one or more topics, one or more entities, and one or more words and phrases associated with user conversations on the chat interface.

11. The computer system of claim 10, wherein the generated programmatic model correlates the user keystroke pattern with the identified information associated with the user chat discourse and adjust the on-screen virtual keyboard layout based on the user keystroke pattern.

12. The computer system of claim 8, wherein adjusting one or more keys on the on-screen virtual keyboard further comprises:

displacing one or more keys on the on-screen virtual keyboard, wherein the displaced one or more keys is moved from a first position to a second position.

13. The computer system of claim 8, wherein adjusting the one or more keys on the on-screen virtual keyboard further comprises:

reducing a touch sensitivity of the one or more keys on the on-screen virtual keyboard.

14. The computer system of claim 8, wherein dynamically adjusting the on-screen virtual keyboard layout further comprises:

dynamically adjusting the on-screen virtual keyboard layout in response to one or more factors, wherein the one or more factors include a time factor and a location factor.

15. A computer program product for adjusting an on-screen virtual keyboard on a computer device, comprising:

one or more tangible computer-readable storage devices and program instructions stored on at least one of the one or more tangible computer-readable storage devices, the program instructions executable by a processor, the program instructions comprising:

program instructions to determine user hand and finger movement in relation to the on-screen virtual keyboard on the computer device;

program instructions to determine a user chat discourse based on information associated with a chat interface on the computer device;

program instructions to generate a programmatic model that combines and correlates the determined user hand and finger movement on the on-screen virtual keyboard with the determined user chat discourse; and program instructions to dynamically adjust an on-screen virtual keyboard layout associated with the on-screen virtual keyboard using the programmatic model, wherein dynamically adjusting the on-screen virtual keyboard layout comprises adjusting one or more keys on the on-screen virtual keyboard in response to information associated with a user and the chat interface.

16. The computer program product of claim 15, wherein the program instructions to determine user hand and finger movement in relation to the on-screen virtual keyboard on the computer device further comprises:

program instructions to digitally record a user keystroke pattern on the on-screen virtual keyboard.

17. The computer program product of claim 16, wherein the program instructions to determine the user chat discourse based on information associated with the chat interface further comprises:

program instructions to perform topic analysis and corpus linguistic on the chat interface to identify the information associated with the chat interface including identifying one or more topics, one or more entities, and one or more words and phrases associated with user conversations on the chat interface.

18. The computer program product of claim 17, wherein the generated programmatic model correlates the user keystroke pattern with the identified information associated with the user chat discourse and adjust the on-screen virtual keyboard layout based on the user keystroke pattern.

19. The computer program product of claim 15, wherein the program instructions to adjust the one or more keys on the on-screen virtual keyboard further comprises:

program instructions to displace the one or more keys on the on-screen virtual keyboard, wherein the displaced one or more keys is moved from a first position to a second position.

20. The computer program product of claim 15, wherein the program instructions to adjust the one or more keys on the on-screen virtual keyboard further comprises:

program instructions to reduce a touch sensitivity of the one or more keys on the on-screen virtual keyboard.

\* \* \* \* \*